US009015538B2

(12) United States Patent  (10) Patent No.: US 9,015,538 B2
Olgaard  (45) Date of Patent: Apr. 21, 2015

(54) METHOD FOR TESTING DATA PACKET SIGNAL TRANSCEIVERS WITH MULTIPLE RADIO ACCESS TECHNOLOGIES USING INTERLEAVED DEVICE SETUP AND TESTING

(71) Applicant: LitePoint Corporation, Sunnyvale, CA (US)

(72) Inventor: Christian Volf Olgaard, Saratoga, CA (US)

(73) Assignee: Litepoint Corporation, Sunnyvale, CA (US)

( * ) Notice: Subject to any disclaimer, the term of this patent is extended or adjusted under 35 U.S.C. 154(b) by 128 days.

(21) Appl. No.: 14/017,077

(22) Filed: Sep. 3, 2013

(65) Prior Publication Data

US 2015/0067417 A1  Mar. 5, 2015

(51) Int. Cl.
  *G01R 31/28* (2006.01)
  *H04L 12/26* (2006.01)
(52) U.S. Cl.
  CPC ..................... *H04L 43/50* (2013.01)
(58) Field of Classification Search
  CPC ............ H04L 12/2858; H04L 12/2863; H04L 12/5692; H04W 24/00
  USPC ................... 714/742, 821; 370/241, 310, 328
  See application file for complete search history.

(56) References Cited

U.S. PATENT DOCUMENTS

| | | | |
|---|---|---|---|
| 7,240,258 B1 | 7/2007 | Hayes | |
| 7,750,660 B2 * | 7/2010 | Varadarajan et al. | 324/762.03 |
| 7,773,531 B2 * | 8/2010 | Olgaard et al. | 370/241 |
| 7,962,823 B2 * | 6/2011 | Olgaard | 714/742 |
| 2004/0193990 A1 | 9/2004 | Ichiyoshi | |
| 2006/0012388 A1 | 1/2006 | Lin et al. | |
| 2006/0215744 A1 | 9/2006 | O'Neill | |
| 2007/0243825 A1 | 10/2007 | Olgaard et al. | |
| 2008/0172588 A1 | 7/2008 | Olgaard | |
| 2010/0261431 A1 | 10/2010 | Olgaard | |
| 2011/0044218 A1 * | 2/2011 | Kaur et al. | 370/310 |
| 2011/0069624 A1 | 3/2011 | Olgaard | |
| 2011/0075605 A1 * | 3/2011 | De Pasquale et al. | 370/328 |
| 2011/0237188 A1 * | 9/2011 | Sen | 455/41.2 |
| 2011/0274183 A1 * | 11/2011 | Wang | 375/259 |
| 2011/0292809 A1 * | 12/2011 | Olgaard et al. | 370/241 |
| 2012/0121001 A1 | 5/2012 | Olgaard et al. | |

OTHER PUBLICATIONS

Internatinal Search Report and Written Opinion in PCT/US2014/050297 issued on Nov. 11, 2014, 10 pages.
U.S. Appl. No. 14/017,04, filed Sep. 3, 2013, "Method for Testing Data Packet Signal Transceivers Using Interleaved Device Setup and Testing".
U.S. Appl. No. 13/462,459, filed May 2, 2012, "System and Method for Initiating Testing of Multiple Communication Devices".
U.S. Appl. No. 13/595,556, filed Aug. 27, 2012, "System and Method for Testing Radio Frequency Device Under Test Capable of Communicating Using Multiple Radio Access Technologies".
U.S. Appl. No. 13/716,369, filed Dec. 17, 2012, "System and Method for Parallel Testing of Multiple Data Packet Signal Transceivers".
International Search Report and Written Opinion in PCT/US2014/050285 issued Nov. 19, 2014, 14 pages.

* cited by examiner

*Primary Examiner* — David Ton
(74) *Attorney, Agent, or Firm* — Vedder Price, P.C.

(57) ABSTRACT

A method of using tester data packet signals and control instructions for testing a radio frequency (RF) data packet signal transceiver device under test (DUT) capable of communicating using multiple radio access technologies (RATs) having one or more mutually distinct signal characteristics. During mutually alternating time intervals, selected ones of which are substantially contemporaneous, tester data packet signals and control instructions are used for concurrent testing and configuration for testing, respectively, of multiple RATs of the DUT.

10 Claims, 5 Drawing Sheets

METHOD FOR TESTING DATA PACKET SIGNAL TRANSCEIVERS WITH MULTIPLE RADIO ACCESS TECHNOLOGIES USING INTERLEAVED DEVICE SETUP AND TESTING

BACKGROUND

The present invention relates to testing data packet signal transceivers with multiple radio access technologies, and in particular, to achieving faster test times for such transceivers by using interleaved device setup and testing.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems (also referred to as "testers") employ a subsystem for analyzing signals received from each device. Such subsystems typically include at least a vector signal generator (VSG) for providing the source signals to be transmitted to the device under test, and a vector signal analyzer (VSA) for analyzing signals produced by the device under test. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

As these types of wireless devices have become more sophisticated, they now often include transceiver circuitry that provides communications and connectivity based on multiple standards-based technologies, often referred to as radio access technologies (RATs), such as 4G LTE cellular, GSM, IEEE 802.11x WiFi, and Bluetooth, to name a few.

To fully test such devices capable of communicating using multiple RATs, each technology and its related transceiver circuitry must be tested against the appropriate standards-based specification for that technology. If these tests are carried out sequentially, overall test time can be several minutes, which is a long time when testing many thousands, and more often millions, of devices. One solution for reducing the per-device test time is to test several devices under test (DUTs) concurrently. For example, five separate test systems (often referred to as "testers") can be used concurrently, with each tester testing one DUT at the same time. This would effectively reduce the per-DUT test time by 80%. However, this increased number of testers significantly increases capital equipment costs, thereby diminishing or negating any cost savings for reduced test time. Further, many DUTs may share a test point (e.g., an input/output signal port) between two or more RATs, thereby making it difficult to test the individual RATs simultaneously, since each RAT may require use of one or more different signal characteristics, such as signal carrier frequency, modulation frequency, modulation type, data rate, etc. Lastly, testing different RATs rarely require similar test times. Hence, at least some portion, if not a significant portion, of a test system will remain idle during testing of different RATs.

One technique for minimizing test equipment costs while reducing overall test time is to use a tester having a single VSA and single VSG with a switching subsystem that can switch the VSA and VSG among multiple input/output (I/O) signal ports such that multiple DUTs can be tested substantially concurrently, though not exactly in parallel, since the single VSA cannot capture and analyze transmitted signals from multiple DUTs concurrently. Alternatively, resource sharing can include use of a common I/O signal port, where possible, and switch among the multiple DUTs. While such systems using switching subsystems and sharing resources can maintain reduced test equipment costs, reductions in test time can be better realized using a system with a VSA and a VSG for each DUT signal port, though at significantly higher test equipment cost.

SUMMARY

In accordance with the presently claimed invention, a method is provided for using tester data packet signals and control instructions for testing a radio frequency (RF) data packet signal transceiver device under test (DUT) capable of communicating using multiple radio access technologies (RATs) having one or more mutually distinct signal characteristics. During mutually alternating time intervals, selected ones of which are substantially contemporaneous, tester data packet signals and control instructions are used for concurrent testing and configuration for testing, respectively, of multiple RATs of the DUT.

In accordance with one embodiment of the presently claimed invention, a method of using tester data packet signals and control instructions for testing a radio frequency (RF) data packet signal transceiver device under test (DUT) capable of communicating using multiple radio access technologies (RATs) having one or more mutually distinct signal characteristics includes: communicating, via a DUT during one of a first plurality of test intervals, at least one of a first tester data packet signal and DUT data packet signal having a first plurality of signal characteristics in accordance with a first one of a plurality of RATs; communicating, via the DUT during one of a second plurality of test intervals, at least one of a second tester data packet signal and DUT data packet signal having a second plurality of signal characteristics in accordance with a second one of the plurality of RATs; executing, with the DUT during one of a first plurality of instruction intervals, a plurality of DUT control instructions to configure the DUT to communicate the at least one of a first tester data packet signal and DUT data packet signal; and executing, with the DUT during one of a second plurality of instruction intervals, another plurality of DUT control instructions to configure the DUT to communicate the at least one of a second tester data packet signal and DUT data packet signal. Respective ones of the first plurality of test intervals and the first plurality of instruction intervals are mutually alternating, respective ones of the second plurality of test intervals and the second plurality of instruction intervals are mutually alternating, respective ones of the first plurality of test intervals are substantially contemporaneous with respective ones of the second plurality of instruction intervals, and respective ones of the second plurality of test intervals are substantially contemporaneous with respective ones of the first plurality of instruction intervals.

In accordance with another embodiment of the presently claimed invention, a method of providing tester data packet signals and control instructions for testing a radio frequency (RF) data packet signal transceiver device under test (DUT) capable of communicating using multiple radio access technologies (RATs) having one or more mutually distinct signal characteristics includes: communicating, with a DUT during one of a first plurality of test intervals, at least one of a first tester data packet signal and DUT data packet signal having a first plurality of signal characteristics in accordance with a first one of a plurality of RATs; communicating, with the DUT during one of a second plurality of test intervals, at least one of a second tester data packet signal and DUT data packet signal having a second plurality of signal characteristics in accordance with a second one of the plurality of RATs; providing, for execution by the DUT during one of a first plurality of instruction intervals, a plurality of DUT control instructions to configure the DUT to communicate the at least one of a first tester data packet signal and DUT data packet signal; and providing, for execution by the DUT during one of a second plurality of instruction intervals, another plurality of DUT control instructions to configure the DUT to communicate the at least one of a second tester data packet signal and DUT data packet signal. Respective ones of the first plurality of test intervals and the first plurality of instruction intervals are mutually alternating, respective ones of the second plurality of test intervals and the second plurality of instruction intervals are mutually alternating, respective ones of the first plurality of test intervals are substantially contemporaneous with respective ones of the second plurality of instruction intervals, and respective ones of the second plurality of test intervals are substantially contemporaneous with respective ones of the first plurality of instruction intervals.

DETAILED DESCRIPTION

Figure 1:
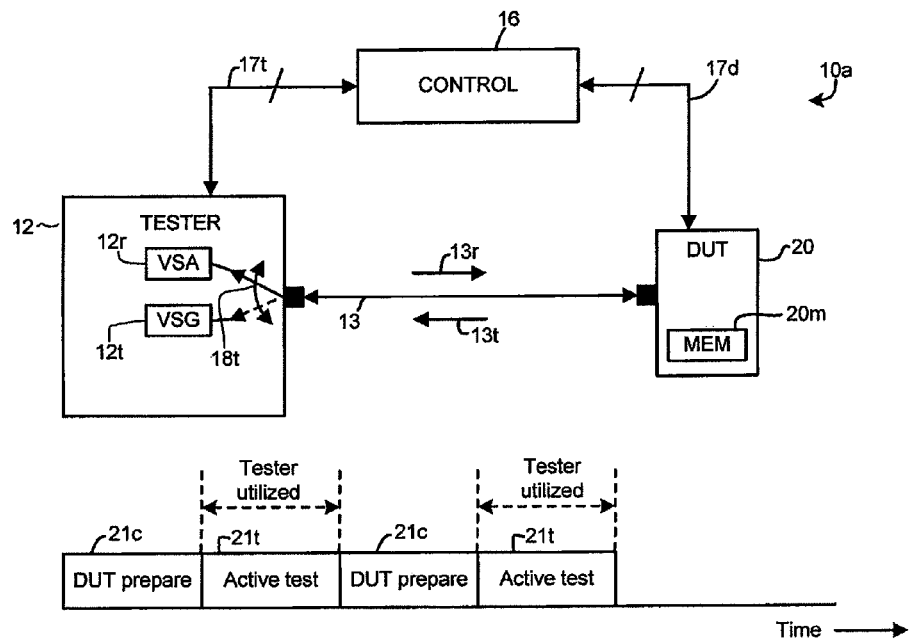
FIG. 1 depicts a testing environment and signal diagram for a conventional technique for testing wireless signal transceivers.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, and the like, often make use of multiple standards-based wireless signal technologies, or RATs, such as: IEEE 802.11a, b, g, n, ac; 3GPP LTE; and Bluetooth. The standards that underlie these technologies are designed to provide reliable wireless connectivity or communications, and prescribe physical and higher-level specifications that are generally chosen to be highly energy efficient and to minimize interference among devices using the same or other technologies that are adjacent to or share the wireless spectrum.

Tests prescribed by these standards are meant to ensure that such devices are designed to conform to standard-prescribed specifications and that manufactured devices continue to conform to those prescribed specifications. Most devices are transceivers, containing at least one or more (each) receivers and transmitters. Thus, tests will determine whether both receivers and transmitters of a device under test (DUT) conform. Tests of a DUT's receiver or receivers are RX tests, and typically involve sending of test packets by a test system, or tester, to the receiver(s) and some means of determining how the DUT's receiver(s) respond to those test packets. A DUT's transmitters are tested by having them send packets to the test system, which then evaluates the physical characteristics of the signals sent by the devices.

The RX test packets are generated by the test system (e.g., a VSG) and the TX test packets are generated by the DUT and evaluated by a test system's analysis subsystem (e.g., a VSA).

As discussed in more detail below, in accordance with exemplary embodiments of the presently claimed invention, overall test time can be reduced and cost savings thereby achieved by concurrently performing various tasks, or operations, of the test. This is particularly useful for testing so-called smartphone devices that combine cellular telephone and other device or signal connectivity technologies, and where test times for the cellular telephone technologies can be significantly longer than those for connectivity technologies. As discussed below, reduced test time is achieved by interleaving testing tasks for different RATs within a single test flow, thereby reducing overall test time and increasing test equipment utilization.

Testing of wireless signal transceivers involves two essential processes, or elements: a DUT test preparation and conditioning element, and the active test element. During DUT test preparation, the test equipment is inactive, at least inasmuch as neither the VSA nor VSG are actively communicating or otherwise interacting with the DUT. This is in contrast to the active test element, during which the VSA is capturing incoming data packet signals from one or more DUTs sequentially, and/or the VSG is transmitting data packet test signals for conveyance to one or more of the DUTs.

When the test system is not actively testing a DUT, its utilization and, therefore, test efficiency is reduced. Hence, ideally, it would be desirable to have a testing technique that maximizes test equipment utilization by actively testing one or more DUTs at all times, thereby increasing throughput by either reducing individual DUT test time or by testing more DUTs concurrently. However, in those testing scenarios where a single tester is testing a single DUT, each instance of DUT test preparation represents a portion of test time during which a tester is not otherwise active in testing of the DUT. Unfortunately, there is no way to completely eliminate such DUT test preparation instances.

As discussed in more detail below, in accordance with the presently claimed invention, DUT test preparation is not merely endured by awaiting its completion. Rather, such DUT test preparation time is used by the tester to test a different RAT for the same DUT. This can be achieved by switching among the different signal ports of the DUT, or by using a different RAT when communicating with or connecting to the current DUT signal port in those cases where multiple RATs share a common DUT signal port. For example, RATs sharing a single DUT signal port can include Bluetooth (BT), IEEE 802.11b/g and WiFi in the 2.4 GHz frequency band. Since these RATs share a common frequency band, they can, and often do, share a common DUT signal port.

Referring to FIG. 1, a testing environment 10a for testing a DUT 20 includes a tester 12 and a control system or circuitry 16 (which may be external to, as well as remote from, the tester 12, or may be internal to, e.g. part of, the tester 12). In accordance with well knows principles, the tester 12 includes a test signal source 12t (e.g., a VSG) and a test signal analyzer 12r (e.g., a VSA), along with a signal switching subsystem 18t for selecting between the connections with the signal source 12t and signal analyzer 12r. Test signals from and to the tester 12 are conveyed via a signal path 13 (typically a conductive signal path in the form of coaxial radio frequency (RF) cable and connectors) to and from DUT 20.

The control system 16 provides control signals (e.g., instructions and data) and receives data from the tester 12 and DUT 20 via one or more respective control signal interfaces 17t, 17d, which may be separate or shared (e.g., via a network). The DUT 20 can include memory circuitry 20m for storing instructions and data, as desired, for later or repeated execution and use.

As depicted in the signal diagram, during a receive (by the DUT) signal test, the DUT 20 executes a DUT preparation program (e.g., preparation instructions received in real time from the control system 16 or previously received and stored in the memory 20m), during which time 21c the test equipment is inactive. Following this DUT preparation interval 21c, the test for which the DUT 20 has been prepared (i.e., the active test) is performed 21t. During this time 21t for a receive signal test, the VSG 12t transmits a test data packets signal 13r for conveyance to the DUT. Conversely, during a transmit (by the DUT) signal test, during such active test 21t, the DUT 20 transmits a test data packet signal 13t for conveyance to the tester 12.

As shown, each active test segment 21t is followed by a DUT preparation segment 21c. It is only during active test segments that the tester 12 is being utilized, at least in the sense of actively communicating or otherwise interacting with the DUT 20. If the duration of the DUT preparation segment 21c is double the duration of the active test segment 21t, utilization of the tester 12 would be approximately 33%. Hence, over the course of an hour of testing, the tester is actively testing for a mere 20 minutes. Moreover, if the necessary physical handling of the DUTs (e.g., loading, unloading, connecting, disconnecting, etc.) is taken into account as well, the rate of tester utilization is further reduced.

Figure 2:
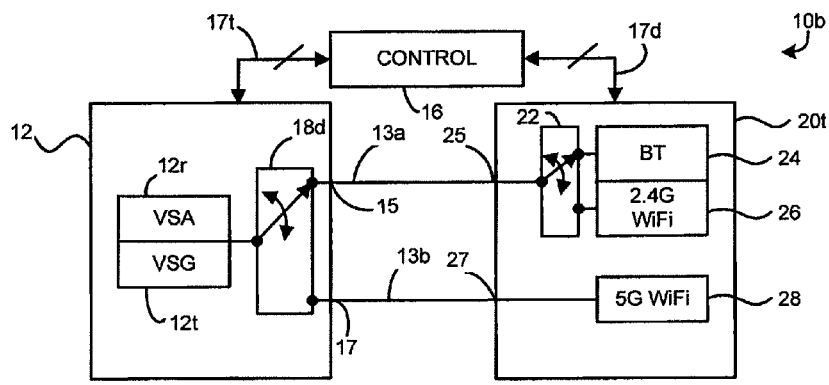
FIG. 2 depicts an alternative conventional testing environment for testing wireless signal transceivers.

Referring to FIG. 2, in another testing environment 10b, the DUT 20t is one that includes multiple RATs, e.g., Bluetooth 24, 2.4 GHz WiFi 26 and 5 GHz WiFi 28. Two RATs 24, 26 share a DUT signal port 25 via signal switching or combiner circuitry 22, while the third RAT 28 has its own signal port 27. As before, the DUT 20t communicates with the tester 12 via signal paths 13a, 13b (e.g., conductive RF signal cables and connectors), and the tester 12 includes switching circuitry 18d for selecting between signal ports 15, 17 to receive signals from or convey signals to the DUT 20t.

Figure 3:
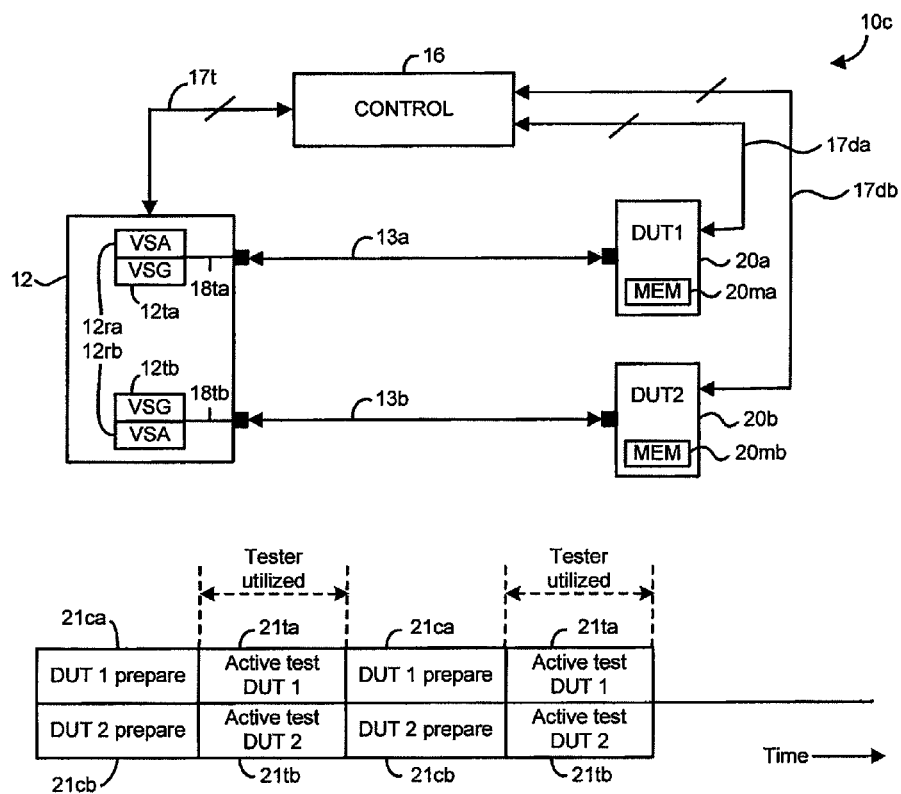
FIG. 3 depicts another alternative conventional testing environment and signal diagram for testing multiple wireless signal transceivers.

Referring to FIG. 3, as discussed above, one way to reduce per-DUT test time is to test multiple DUTs in parallel. This is true regardless whether the DUTs use a single RAT (FIG. 1) or multiple DUTs (FIG. 2.) One technique requires a tester 12 having a VSA 12r and VSG 12t for each DUT 20, such as a VSA 12ra and VSG 12ta for testing one DUT 20a, and another VSA 12rb and VSG12tb for testing another DUT 20b. Alternatively, other techniques can share a VSA and VSG while including additional hardware (e.g., power switches, splitters, combiners, etc.) for interleaving, or multiplexing, respective uses of the VSA and VSG between the DUTs 20a, 20b. This would enable the tester 12 to conduct multiple DUT tests, similar to those discussed above (FIG. 1), in parallel. However, as before, the DUT preparation intervals 21ca, 21cb, during which the tester 12 is inactive, alternate with the active test intervals 21ta, 21tb. Accordingly, depending upon the relative durations of the preparation 21c and test 21t intervals, utilization of the tester 12 remains low, even though per-DUT test time is reduced. In other words, test time on a per DUT basis improves (e.g., perhaps a slightly longer overall test time but with the benefit of now testing more DUTs at a time) while tester utilization remains substantially unaffected.

Figure 4:
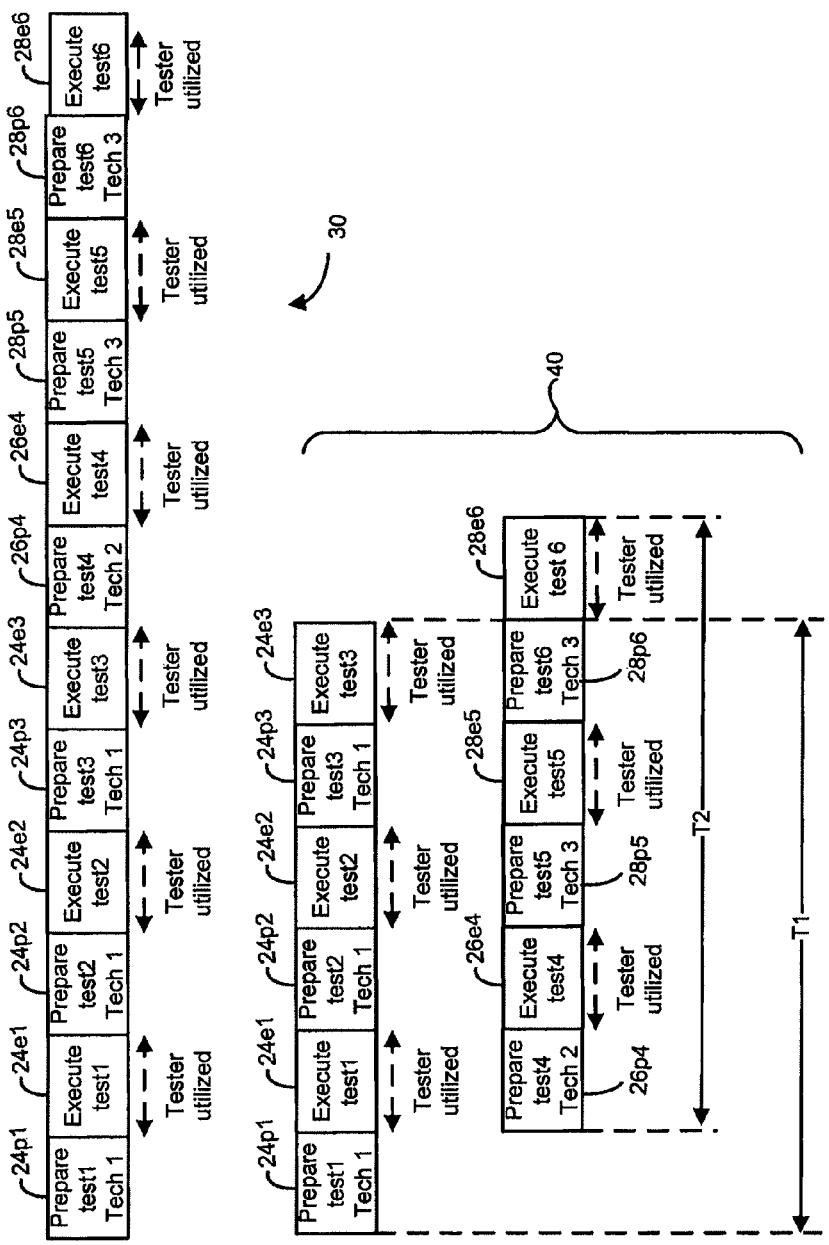
FIG. 4 depicts a timing diagram for a method of testing wireless signal transceivers in accordance with an exemplary embodiment of the presently claimed invention.

Referring to FIG. 4, simultaneous improvements in DUT test time (decreased) and tester utilization (increased) in accordance with embodiments of the presently claimed invention can be better understood. As discussed above, conventional wireless signal transceiver testing, whether performed on a single DUT (FIG. 1) or multiple DUTs (FIG. 3) rely on sequential test intervals 30, or elements, in which DUT preparation intervals 24p, 26p, 28p are interleaved, or alternate, with test execution intervals 24e, 26e, 28e. For example, in the case of testing a DUT 20t having multiple RATs 24, 26, 28 (FIG. 2), the DUT 20t is prepared during three preparation intervals 24p1, 24p2, 24p3 for testing the first RAT 24, followed by respective test execution intervals 24e1, 24e2, 24e3. This is followed by DUT preparation 26p4 for testing the second RAT 26, followed, in turn, by execution 26e4 of such test. Further in turn, are DUT preparation intervals 28p5, 28p6 for executing tests 28e5, 28e6 of the third RAT 28. As discussed above, this testing technique 30 results in significant under-utilization of the tester.

In accordance with an exemplary embodiment 40 of the presently claimed invention, however, utilization of the tester is interleaved with (e.g., overlapped with) DUT preparation. For example, as before, DUT preparation intervals 24p1, 24p2, 24p3 alternate with DUT test execution intervals 24e1, 24e2, 24e3 for the first RAT 24. However, overlapping this time interval T1 for alternately preparing and testing the first RAT 24, is another time interval T2 for alternately preparing and testing the second 26 and third 28 RATs, during which DUT preparation intervals 26*p*4, 28*p*5, 28*p*6 alternate with DUT test execution intervals 26*e*4, 28*e*5, 28*e*6 for the second 26 and third 28 RATs. As can be seen, this effectively achieves full utilization (e.g., 100%) of the tester 12.

Figure 5:
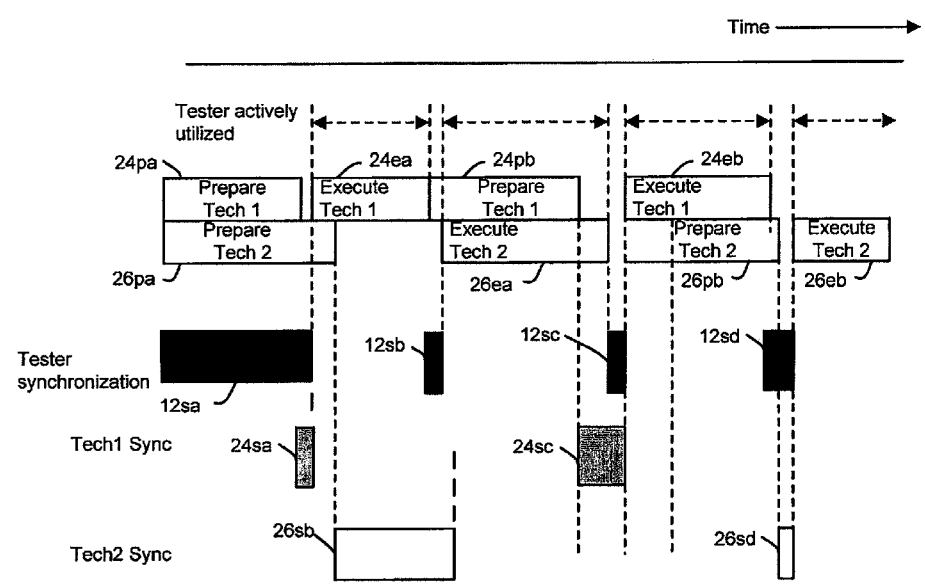
FIG. 5 depicts a timing diagram for a method of testing wireless signal transceivers in accordance with another exemplary embodiment of the presently claimed invention.

Referring to FIG. 5, achieving the interleaving and concurrent performance of DUT preparation and testing, as depicted in FIG. 4, can be realized as follows. While it is assumed that the different RATs can be tested independently of each other, proper synchronization for scheduling such independent tests is important. Ensuring proper DUT preparation and test execution can be assured using synchronization originated by the tester 12. In accordance with exemplary embodiments, the DUT 20 can be controlled or programmed to listen for a command from the tester 12. This can be implemented using a simple receive data packet sent from the tester 12 to the DUT to which the DUT responds with an acknowledgment (ACK) signal or simple loop-back operation (e.g., by having the DUT 20 react on a provided down-link signal from the tester 12) such as often used in cellular system testing and other time-division-duplex (TDD) based systems, such as Bluetooth.

As the RATs are operated independently, initial operations include preparations 24*pa*, 26*pa* of both RATs in parallel. Concurrently, the tester 12 will begin attempting synchronization 12*sa* to initiate testing of the first RAT 24. When the first RAT 24 is ready for testing, it will begin attempting synchronization 24*sa* to the tester 12. As the tester 12 is already awaiting synchronization, it can respond quickly by proceeding to execution of the first RAT test 24*ea*.

Similarly, following readiness of the second RAT 26, it will begin attempting synchronization 26*sb* to the tester 12. Following completion of the first RAT test 24*ea*, the tester 12 will begin attempting synchronization 12*sb* to the second RAT 26. Following readiness of the second RAT 26, execution 26*ea* in accordance with the RAT 26 will begin. Meanwhile, the first RAT 24 is being prepared 24*pb* for its next text. Following readiness of the first technology 24 for its next test, the DUT 20*t* will begin attempting synchronization 24*sc* to the tester 12. Meanwhile, following execution of the second RAT test 26*ea*, the tester 12 begins attempting synchronization 12*sc* with the DUT 20*t*. Concurrently therewith, preparation 26*pb* for the next test of the second RAT 26 (or the third technology 28 if testing of the second technology 26 is complete) begins. Following completion of the first RAT testing 24*eb*, the tester 12 seeks to initiate synchronization 12*sd* with the DUT 20*t* to begin execution of the test 26*eb* of the second RAT 26.

As will be readily understood by one of ordinary skill in the art, in the case of multiple RATs in a DUT sharing a signal port (FIG. 2), sharing of the common signal port 25 can be accomplished during the DUT test sequence by appropriate control of the signal switch 22 (e.g., to engage one or the other of the RATs 24, 26 to be tested). Alternatively, a test data packet signal transmitted by the tester 12 can be provided with an elevated, or higher than normal, signal magnitude to produce enough of a synchronization signal (signal "leakage") through an otherwise "open" signal switch having finite signal isolation. Once the synchronization data packet is received by the DUT 20*t*, it can control the signal switch 22 to ensure that it provides the desired signal path. Further, it will be understood that different synchronization techniques can be used using various signal contents, properties or characteristics, such as media access control (MAC) address, signal frequency, signal power level, modulation type, bit rate, etc., to prevent multiple RATs being tested from being triggered by the same synchronization signal.

As depicted, it can been seen that, during some time intervals, the tester 12 is awaiting completion by the DUT 21 of its test preparation, while at other times, the DUT 21*t* is awaiting communication with the tester 12. Further optimization to reduce such tester idle time can be achieved in a number of ways. For example, if the tester is waiting on the DUT, a third RAT can be tested in the meantime. Alternatively, the test flow can be re-arranged, as desired, for more optimal tester utilization. In any event, however, it can be seen that tester utilization is increased significantly, thereby reducing overall test time.

Figure 6:
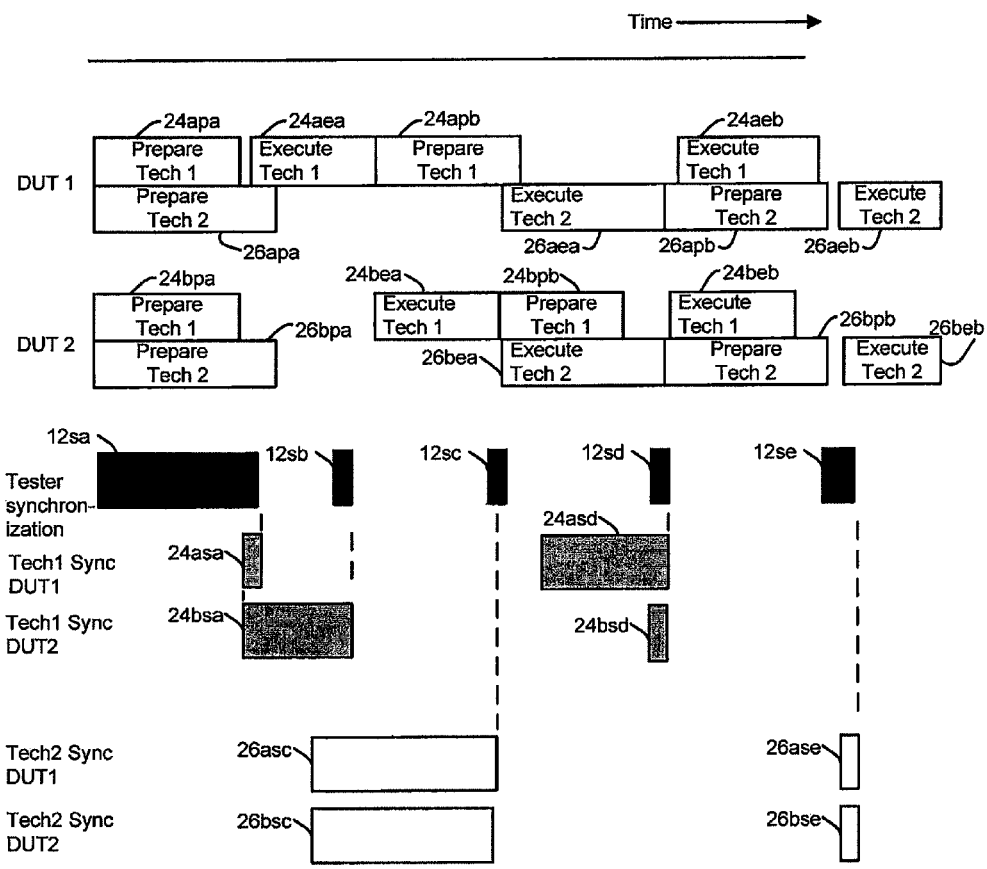
FIG. 6 depicts a timing diagram for a method of testing wireless signal transceivers in accordance with another exemplary embodiment of the presently claimed invention.

Referring to FIG. 6, similar techniques in accordance with further exemplary embodiments of the presently claimed invention, can be applied to achieve similar increases in tester utilization when multiple DUTs are tested in parallel using a tester designed for parallel testing with shared resources (FIG. 1). To begin, two RATs 24, 26 of both DUTs (e.g., where, for purposes of this example, two DUTs are tested in parallel, though this technique can be scaled up to more DUTs) are prepared 24*apa*, 26*apa*, 24*bpa*, 26*bpa* substantially concurrently. Since the tester 12 knows that execution 24*aea* of the first DUT test will fully occupy tester 12 resources, it sends a synchronization data packet 12*sa* to the first DUT (e.g., by using different MAC addresses for each DUT or by corrupting synchronization data packets to the DUT(s) other than that for which synchronization is desired, as disclosed in U.S. patent application Ser. No. 13/462,459 (filed May 2, 2012) and Ser. No. 13/716,369 (filed Dec. 17, 2012), the contents of which are incorporated herein by reference.) Following execution 24*aea* of the first RAT test, the tester 12 then initiates synchronization 12*sb* with the second DUT and continues on to prepare 24*apb* first DUT for the next test of the first RAT 24. Following completion of the execution 24*bea* of the first RAT test 24 of the second DUT, the tester 12 initiates synchronization 12*sc* to both DUTs. In this case, the tester 12 can execute 26*aea*, 26*bea* testing of the second RAT 26 in both DUTs concurrently. For example, a receive test can be performed where the tester 12 can provide a test data packet signal to both DUTs concurrently, or capture test data packet signals from the DUTs by interleaving data packet capturing by the VSA between the two test ports 15, 17 (FIG. 2).

The remaining instances of DUT preparations 26*apb*, 26*bpb* and test executions 24*aeb*, 24*beb* can be completed in parallel, thereby achieving the test flow depicted in FIG. 4 while being executed over multiple DUTs in parallel. Alternatively, if the tester 12 has a dedicated VSA and VSG for each DUT test port (FIG. 3), then the initial first RAT tests 24*aea*, 24*bea* can be executed concurrently, without need for interleaving as depicted here.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of using tester data packet signals and control instructions for testing a radio frequency (RF) data packet signal transceiver device under test (DUT) capable of communicating using multiple radio access technologies (RATs) having one or more mutually distinct signal characteristics, comprising:

communicating, via a DUT during one of a first plurality of test intervals, at least one of a first tester data packet signal and DUT data packet signal having a first plurality of signal characteristics in accordance with a first one of a plurality of RATs;

communicating, via said DUT during one of a second plurality of test intervals, at least one of a second tester data packet signal and DUT data packet signal having a second plurality of signal characteristics in accordance with a second one of said plurality of RATs;

executing, with said DUT during one of a first plurality of instruction intervals, a plurality of DUT control instructions to configure said DUT to communicate said at least one of a first tester data packet signal and DUT data packet signal; and executing, with said DUT during one of a second plurality of instruction intervals, another plurality of DUT control instructions to configure said DUT to communicate said at least one of a second tester data packet signal and DUT data packet signal;

wherein
respective ones of said first plurality of test intervals and said first plurality of instruction intervals are mutually alternating, respective ones of said second plurality of test intervals and said second plurality of instruction intervals are mutually alternating, respective ones of said first plurality of test intervals are substantially contemporaneous with respective ones of said second plurality of instruction intervals, and respective ones of said second plurality of test intervals are substantially contemporaneous with respective ones of said first plurality of instruction intervals.

2. The method of claim 1, wherein:
respective ones of said first and second pluralities of test intervals are mutually alternating; and
respective ones of said first and second pluralities of instruction intervals are mutually alternating.

3. The method of claim 1, wherein said respective ones of said first and second pluralities of test intervals are mutually exclusive.

4. The method of claim 1, wherein said respective ones of said first and second pluralities of instruction intervals are mutually exclusive.

5. The method of claim 1, wherein said respective ones of said first and second pluralities of instruction intervals are partially contemporaneous.

6. A method of providing tester data packet signals and control instructions for testing a radio frequency (RF) data packet signal transceiver device under test (DUT) capable of communicating using multiple radio access technologies (RATs) having one or more mutually distinct signal characteristics, comprising:

communicating, with a DUT during one of a first plurality of test intervals, at least one of a first tester data packet signal and DUT data packet signal having a first plurality of signal characteristics in accordance with a first one of a plurality of RATs;

communicating, with said DUT during one of a second plurality of test intervals, at least one of a second tester data packet signal and DUT data packet signal having a second plurality of signal characteristics in accordance with a second one of said plurality of RATs;

providing, for execution by said DUT during one of a first plurality of instruction intervals, a plurality of DUT control instructions to configure said DUT to communicate said at least one of a first tester data packet signal and DUT data packet signal; and providing, for execution by said DUT during one of a second plurality of instruction intervals, another plurality of DUT control instructions to configure said DUT to communicate said at least one of a second tester data packet signal and DUT data packet signal;

wherein
respective ones of said first plurality of test intervals and said first plurality of instruction intervals are mutually alternating, respective ones of said second plurality of test intervals and said second plurality of instruction intervals are mutually alternating, respective ones of said first plurality of test intervals are substantially contemporaneous with respective ones of said second plurality of instruction intervals, and respective ones of said second plurality of test intervals are substantially contemporaneous with respective ones of said first plurality of instruction intervals.

7. The method of claim 6, wherein:
respective ones of said first and second pluralities of test intervals are mutually alternating; and
respective ones of said first and second pluralities of instruction intervals are mutually alternating.

8. The method of claim 6, wherein said respective ones of said first and second pluralities of test intervals are mutually exclusive.

9. The method of claim 6, wherein said respective ones of said first and second pluralities of instruction intervals are mutually exclusive.

10. The method of claim 6, wherein said respective ones of said first and second pluralities of instruction intervals are partially contemporaneous.

* * * * *